No. 647,175. Patented Apr. 10, 1900.
F. BEDELL.
TRANSMISSION OF ELECTRICAL IMPULSES.
(Application filed May 22, 1899.)

(No Model.) 2 Sheets—Sheet 1.

Witnesses:
Raphael Netter
L. T. Shaw

Frederick Bedell Inventor
by E. M. Bentley Atty.

No. 647,175. Patented Apr. 10, 1900.
F. BEDELL.
TRANSMISSION OF ELECTRICAL IMPULSES.
(Application filed May 22, 1899.)
(No Model.) 2 Sheets—Sheet 2.

Witnesses:
Raphael Netter
L. J. Shaw

Frederick Bedell Inventor
by E. M. Bentley Atty.

UNITED STATES PATENT OFFICE.

FREDERICK BEDELL, OF ITHACA, NEW YORK.

TRANSMISSION OF ELECTRICAL IMPULSES.

SPECIFICATION forming part of Letters Patent No. 647,175, dated April 10, 1900.

Application filed May 22, 1899. Serial No. 717,736. (No model.)

*To all whom it may concern:*

Be it known that I, FREDERICK BEDELL, a citizen of the United States, residing at Ithaca, county of Tompkins, and State of New York, have invented certain new and useful Improvements in the Transmission of Electrical Impulses, of which the following is a specification, reference being made to the accompanying drawings, wherein—

Figure 11:
Figure 12:
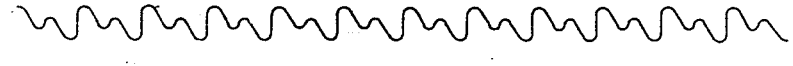
Figure 13:
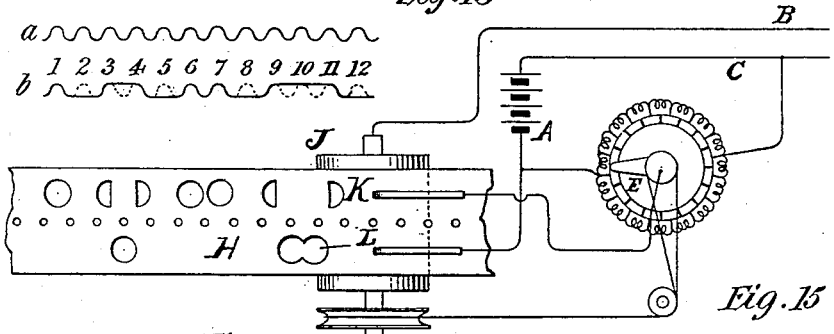
Figure 14:
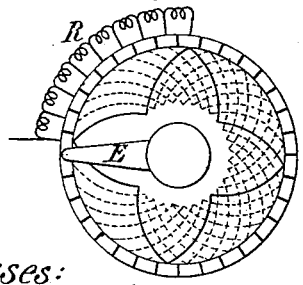
Figure 15:
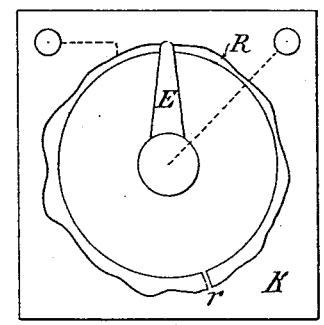

Figures 1 to 6 illustrate, diagrammatically, the principles of my invention. Figs. 7 to 12 illustrate different wave forms which the current impulses may assume. Fig. 13 illustrates a form of apparatus which may be employed to carry out my invention, and Figs. 14 and 15 represent modified features which may be employed in connection with such apparatus.

My invention relates to the transmission of impulses of current over any desired circuit, but is particularly adapted for the transmission either by land-line or submarine cable of telegraphic currents in which the succeeding impulses are combined and modified in a predetermined manner so as to send intelligible messages according to a specified code.

In the art of telegraphy it has heretofore been common to transmit positive and negative impulses over a circuit so combined as to afford a means of communication in conformity with a prescribed code. It has also been proposed to transmit a series of alternating-current impulses of a uniform frequency and to interrupt the alternating current thus introduced into the circuit at the zero-points in accordance with a prearranged code.

In neither one of the two methods just mentioned am I aware that it has been attempted to modify or vary the wave form of the current impulse to meet particular circuit conditions, while in the second method of the two the interruption at the zero-point has heretofore occurred at the moment of the greatest self-induction, when the current wave is changing from positive to negative, or vice versa, at the highest rate, the curve of electromotive force being comparatively steep on either side of the zero-line. These alternating-current impulses are also derived from a dynamo-electric machine in which it is not easy to vary the form of the electromotive-force wave which the machine will naturally produce, and, moreover, since the machine gives an inflexible succession of alternating impulses it is impracticable to utilize different wave lengths of current as elements of a code. Thus the code elements may consist of one, two, or more impulses divided by longer or shorter interruptions of the current; but the grouping of two or more impulses involves two or more changes from zero to maximum, with a corresponding amount of self-induction, which would be avoided if the impulses could be conveniently made of different lengths, so that each one would involve but one rise from zero to maximum and one corresponding fall from maximum to zero. In other words, if we take the wave curve of two or more succeeding impulses and bridge from the crest of one wave to that of the succeeding wave we might eliminate the self-induction due to all of the current variation embraced by such a bridge.

It is the object of my invention to provide a system of transmitting current impulses by means of which the current may be interrupted at the zero periods, and in which the impulses may be prolonged to any desired degree, and in which also the form of the wave may be modified as desired and, more particularly, may have, when desired, a long graduated zero-space during which it may be broken at a period of minimum self-induction, and consequently with the minimum spark at the contact. Moreover, I provide a system wherein the inductive disturbances due to current variations are confined to the external line-circuit and eliminated from the source of electromotive force. In consequence of the characteristics above mentioned and the continuity of the impulses I am enabled to employ a higher voltage and secure a higher speed of transmission than would be otherwise possible, the rapidity being further increased by the employment of impulses of different durations in the formation of a code.

I provide in my system any desirable source of direct current and derive therefrom a series of direct-current impulses by including and excluding in a cyclic order a set of graduating resistances which may severally have any desired value, which may even be changed or varied from time to time, so that the succeeding impulses may have a corresponding wave form, and particularly may come, when desired, to a graduated zero, so that at the zero-point the circuit may be broken with the least unfavorable effects, due to inductive and electrostatic disturbances, which may be comprised in the term "line reaction." I also provide an apparatus by which, while the current impulses are transmitted in an invariable sequence, it is yet possible at desired points to suppress the effect of the resistances or maintain a direct connection from battery to line, and thus suppress the modifying effect of the resistances on the current from the crest of one impulse-wave to that of the next or other succeeding wave, and thereby in effect multiply the normal wave length by two, three, or any desired number.

Figure 1:
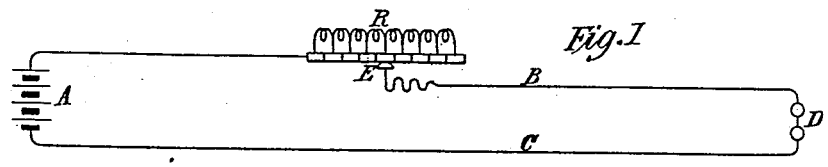

Referring to Fig. 1 of the drawings, let A represent a battery or any other convenient source of direct current which is to be transmitted over a circuit formed by the line-wires B and C to act upon a receiving apparatus D. An ordinary rheostat or adjustable resistance R is shown as included in the circuit in series with the receiver D. It will be evident that if the movable contact E of the rheostat R were caused to reciprocate back and forth over the series of contact-plates of the rheostat R a succession of current impulses would be transmitted over the circuit corresponding to the movement of the contact E and the variation between minimum and maximum in the amount of resistance thereby included in the circuit.

The basis of my invention is the transmission, by means of any suitable apparatus, of current impulses, such as would result from the arrangement illustrated in Fig. 1 or one embodying the same principle, and it is evident that by giving special values to the several sections of rheostat R impulses having any required wave form may be secured at will.

Figure 2:
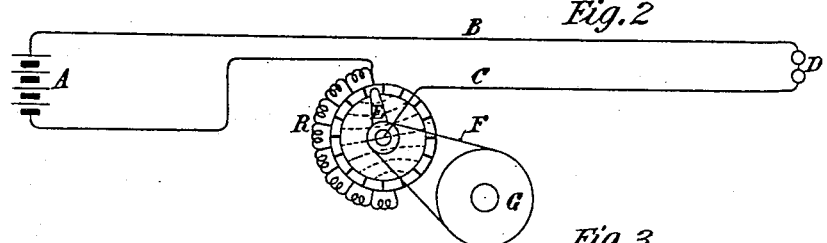

Turning to Fig. 2 of the drawings, I have there shown the contact-plates of rheostat R arranged in a semicircle and connected, respectively, to similar plates forming the complementary semicircle. The contact E is shown as a radial arm journaled concentrically with the series of plates and sweeping over them as it rotates, being driven by any suitable mechanism, such as a belt F, from a pulley G, which in turn may be driven by an electric motor or any other agency having a uniform rate of movement. This arrangement will give the same result as would be secured by the reciprocation of contact E in Fig. 1 and illustrates one method of securing a succession of impulses by a continued rotary movement of the transmitter.

Figure 3:
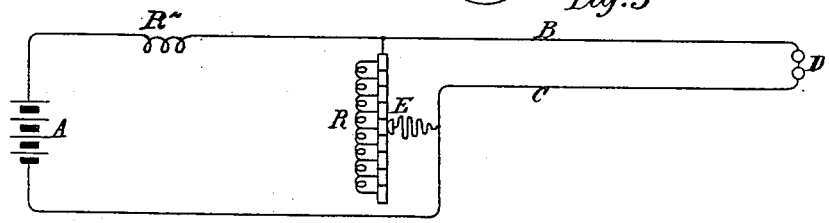

Referring to Fig. 3, the rheostat R is shown as shunting both the battery A and the receiver D, and it is evident that in this manner also there will be a series of impulses transmitted to the circuit by the reciprocation of the contact E of the rheostat R, a short circuit being prevented by the resistance $R^x$ in the line from the battery, as shown.

Figure 4:
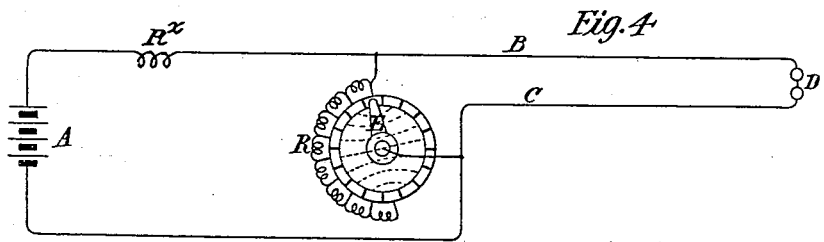
Figure 5:
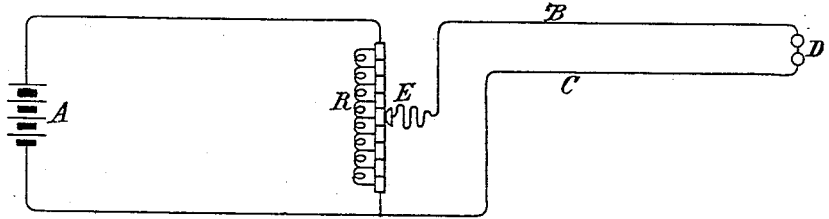

In Fig. 4 there is the same arrangement which appears in Fig. 3, except that the contact E is arranged for rotary instead of reciprocating movement. Again, as indicated in Fig. 5, the rheostat R is partly in series and partly in shunt with the receiver D, and in Fig. 6 the same arrangement is shown, with the provision of a rotary instead of a reciprocating contact E, while I have also shown a second set of rheostat-sections R', connected to the right-hand half of the circular series of contact-plates, so that the rising current-wave may be differentiated from the falling wave, as shown in Figs. 11 and 12, by inserting one series of rheostat-sections and withdrawing another series.

In general I desire it to be understood that I do not intend to limit myself in regard to the particular means employed for transmitting the rheostatically-graduated impulses over the circuit, but may employ any suitable means for securing that result. I would add, however, that I now prefer a device of the general character indicated in Figs. 5 and 6, with the rheostat partly in series and partly in shunt with reference to the circuit.

Figure 6:
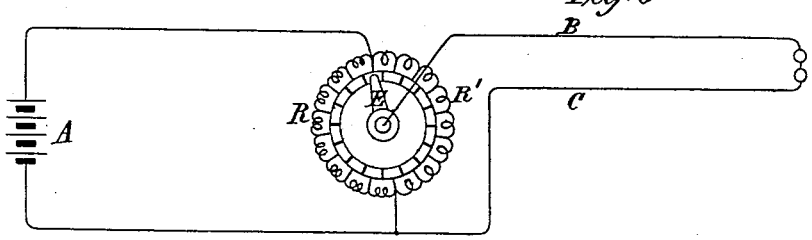
Figure 7:
Figure 8:
Figure 9:
Figure 10:

Referring to Fig. 7, there is shown therein a curve of impressed electromotive-force impulses, which appears as a succession of triangles, this being the form which would result from a complete uniformity in the series of rheostat-sections and a uniform reciprocation of the contact E. If, however, the sections at and near the two extremities of the series have a smaller value than the others, the angles of the curve shown in Fig. 7 will be rounded off, as shown in Fig. 8, and by the same means the curve may be further modified to the form shown in Fig. 9. By the employment of different sets of rheostat-sections for the rising and falling parts of the wave, respectively, as shown in Fig. 6, it may be made to assume the form shown in Fig. 11 or even that shown in Fig. 12.

For utilizing electric current of the form I have described in the transmission of telegraphic messages I may employ any suitable circuit-breaker arranged to interrupt the circuit at the zero-points of the current according to a determined code. Thus I may employ the well-known form of transmitter consisting of a perforated tape running over a metallic cylinder, so as to pass under a brush normally bearing upon such a cylinder, and thus interrupt the connection between the brush and cylinder, except where the perforations may occur in the tape. The tape will be fed synchronously with the rotation of the contact E, described above, and the perforations will be so spaced as to interrupt the circuit at such points of zero-current as may be necessitated by the requirements of the code and the message which is being sent. I prefer, however, to add to a simple apparatus of this kind a second row of perforations in the tape which will control a second contact spring or brush arranged to short-circuit or otherwise eliminate the effect of the impulse-controlling resistance above described. By this means I may so arrange the second row of perforations in the tape as to practically suppress at desired points and for desired periods the modifying effect of the said resistances upon the current and thereby prolong to any desired extent any current impulse or impulses in the series employed for the transmitted message, the wave then being somewhat as appears in Fig. 10.

Referring to Fig. 13, H represents a tape such as I have described passing over a metallic cylinder J and having therein two rows of perforations, while two contact-springs K and L bear on the cylinder above the tape in line with the respective rows of perforations. The cylinder J forms the terminal of line B, while the contact-spring K is connected to contact E and the spring L is connected directly to negative terminal of battery A, whose positive terminal is connected to line C. Obviously the connections may be reversed, the positive battery-terminal being connected to spring L and the negative to the line. If the spring K were permanently in contact with the cylinder J, the line would be closed and the continued operation of the contact E would transmit in the manner already described in connection with Figs. 5 and 6 a series of impulses of a uniform character, such as is indicated at Fig. 13$^a$, but such impulses would be modified or suppressed in a definite manner by any series of perforations in the tape H which might pass under the spring K, such perforations being timed and spaced so that the unperforated parts of the tape will come under spring K at the instant when the current is at its minimum or at zero. Thus considering only the spring K and the line of perforations in the tape shown in the figure there would be (see Fig. 13$^b$) a transmission of impulse 1, a suppression of impulse 2, a transmission of the first half of impulse 3 and the last half of impulse 4, with a suppression of the last half of impulse 3 and the first half of impulse 4, and so on, the suppression corresponding to the unperforated part of the tape and the transmission to the perforated part. Simultaneously, however, with the action of spring K there is the action of the spring L, connected directly to the terminal of battery A, so as to connect the battery directly to line when bearing upon its own line of perforations in tape H. Therefore, as shown in the figure, the suppressing effect of spring K at the last half of impulse 3 and the first half of impulse 4 is neutralized by the spring L, which at the same instant comes over a perforation in the tape, so as to continue the current-flow, which would have been interrupted by the spring K if it alone were operating. Thus the effect of the spring L is to bridge from the crest of impulse-wave 3 to that of impulse-wave 4, as is indicated by the full lines in Fig. 13$^b$. In the same manner spring L comes in again to bridge the impulse-waves 9, 10, and 11. Consequently the resultant effect will be a series of impulses having the form shown by the full-line curve of Fig. 13$^b$. Thus there will be a normal impulse followed by a zero-space, then an impulse of twice the normal length, followed again by a zero-space, then two impulses of normal length, another space, then an impulse of three times the normal length, then another space, and so on. I therefore have available as code elements current impulses either of the normal length or of any multiple thereof, together with zero-spaces of any desired length. With these available elements I can use a code that is very brief with respect to the range of indication which it affords.

The same indicating value may be assigned to a long impulse as is assigned to the several component impulses which would occur during the same period if the impulse were not sustained by means of the brush L. In this case the deleterious effects of self-induction that are inseparable from the multiplicity of short impulses are avoided, as mentioned above. This enables me to transmit more rapidly than would be otherwise possible. In cases where the circuit conditions permit a succession of single impulses these may be employed as code elements as well as the corresponding sustained impulses, a still greater rapidity of transmission being thus made possible on account of the briefer code thereby obtained.

In the foregoing description I have for simplicity shown an arrangement wherein one complete revolution of the contact-arm produces one cycle or impulse of electricity from zero to full value and again to zero. It is commonly desirable, however, to obtain more than one cycle or impulse from one revolution of the arm.

In Fig. 14 I have shown the resistance R as connected to four sets of contact-plates arranged in sequence around a circle, so that a contact-arm in sweeping over them may introduce and withdraw the resistance four times at each rotation, the plates being cross-connected somewhat after the manner of a cross-connected commutator.

Instead of the form of resistance which I have shown, wherein the graduation is secured by sections of resisting-wire included in or excluded from the circuit in succession, I may employ a resisting-conductor and arrange the contact-arm to sweep over it from end to end, so as to give a finer graduation. Thus in Fig. 15, R represents an inlaid ring of carbon set into a block K of insulating material. The carbon ring may have an irregular cross-section, so that its resistance may have any desired value at different points of its length. The arm E will sweep over the carbon ring, and thereby include in or exclude the resistance from the circuit in the manner already described. The ring may be split or interrupted at a point r, so that the resistance of one half will be included in and the resistance of the other half withdrawn from the circuit when it is desired to have the two halves of the current-wave of different form.

It will be understood that in using the expression "graduated resistance" I intend to include such graduation as would be accorded by the apparatus illustrated in Fig. 15 and that the cyclic series of impulses I have described is not limited to a succession of impulses that are uniform in period, value, or wave form, since these may be modified, as I have shown, to make up a code for the transmission of communications. It is to be also understood that I do not in this case make claim to any of the apparatus I have shown and described, since such apparatus has been held to constitute a separate and independent invention from the method which I do claim; but I still regard the said apparatus as my invention and as subject to patent protection in due form without prejudice by reason of its disclosure herein for illustrating my method.

What I claim as new, and desire to secure by Letters Patent, is—

1. The method of telegraphing which consists in transmitting over a circuit a series of rising and falling current impulses derived from a sustained source of electromotive force, whereby the inductive disturbances due to variation of current are eliminated from that portion of the circuit comprised within said source and confined to the portion of the circuit external thereto, and combining said impulses according to a prearranged code.

2. The method of telegraphing which consists in impressing on a circuit impulses of electromotive force of rising and falling value and of adjustable wave form, adjusting said wave form to suit circuit conditions and transmitting certain impulses in accordance with a prearranged code to a suitable receiver at a distant point.

3. The method of telegraphing which consists in deriving from the same source of unidirectional electromotive force a series of direct-current impulses having a gradually rising and falling value and transmitting certain impulses according to a predetermined code to a suitable receiver at a distant point.

4. The method of telegraphing which consists in transmitting over a circuit a series of direct-current impulses, each impulse being derived from the same source of sustained unidirectional electromotive force as the preceding and having a gradually rising and falling value, and interrupting the circuit at moments of zero-current according to a predetermined code.

5. The method of telegraphing which consists in deriving from a battery, or other source of maintained direct current, a series of direct-current impulses having a gradually rising and falling value, transmitting over an electric circuit certain impulses according to a predetermined code and receiving the transmitted impulses by suitable receiving apparatus.

6. The method of telegraphing which consists in impressing upon a circuit a cyclic series of impulses of electromotive force by periodically modifying by means of graduated resistances the effect on the circuit of a source of electromotive force connected thereto, varying the wave form of the impressed electromotive force by adjusting the values of the several portions of the modifying resistances, transmitting certain current impulses according to a predetermined code and receiving the same by a telegraphic receiver.

7. The method of telegraphing which consists in transmitting over a circuit a series of current impulses of one polarity, rising and falling in value with a minimum rate of change when at or near the zero-points, and interrupting the circuit at moments of zero-current according to a predetermined code.

8. The method of telegraphing which consists in transmitting over a circuit current impulses of one polarity having a gradually rising and falling value and combining impulses of different lengths according to a predetermined code.

9. The method of transmitting a series of current impulses over a circuit which consists in impressing a gradually rising and falling electromotive force on the circuit and prolonging certain of the current impulses by impressing a constant electromotive force between succeeding maximum points of the rising and falling sequence.

10. The method of transmitting a series of current impulses over a circuit which consists in periodically modifying the effect of a source of electromotive force connected to the circuit so as to impress a gradually rising and falling electromotive force on the circuit and prolonging certain of the current impulses by impressing a constant electromotive force between succeeding points of the rising and falling sequence.

11. The method of transmitting a series of current impulses which consists in periodically modifying by means of a graduated resistance the effect of a source of constant electromotive force connected to a circuit so as to impress on the circuit a rising and falling electromotive force and prolonging certain of the current impulses by connecting the source of electromotive force directly to the line between succeeding maximum points of the rising and falling sequence.

12. The method of transmitting a series of current impulses which consists in impressing on the circuit an electromotive force graduated by one set of resistances and withdrawing the electromotive force by the graduating effect of a different set of resistances.

13. The method of telegraphing which consists in impressing a series of impulses of electromotive force upon an electric circuit by continuously inserting and withdrawing graduated resistances between the circuit and a source of sustained electromotive force, and transmitting selected current impulses according to a predetermined code.

14. The method of telegraphing which consists in impressing a series of impulses of electromotive force upon an electric circuit by repeatedly modifying by means of a continuously-operated rheostat the effect of a source of sustained electromotive force connected to the circuit, and transmitting selected current impulses according to a predetermined code.

15. The method of telegraphing which consists in impressing a series of impulses of electromotive force upon an electric circuit by periodically connecting the line-circuit to terminals connected to a source of sustained electromotive force arranged in a series of successively greater and lesser potential, and transmitting selected impulses acccording to a predetermined code.

16. The method of telegraphing which consists in deriving from a source of unidirectional electromotive force a continuous and uninterrupted series of unidirectional-electromotive-force impulses, impressing code-determined electromotive-force impulses upon a circuit and transmitting corresponding current impulses to suitable receiving apparatus.

17. The method of telegraphing which consists in transmitting over a circuit a series of current impulses, interrupting the circuit according to a predetermined code at moments when the current is changing at a minimum rate, and receiving the transmitted impulses by suitable receiving apparatus.

18. The method of telegraphing which consists in impressing a series of impulses of electromotive force upon an electric circuit by periodically modifying the effect of a source of sustained electromotive force connected to the circuit and interrupting the circuit between said impulses according to a predetermined code.

19. The method of telegraphing which consists in transmitting over a circuit a series of current impulses rising and falling in value with minimum line reaction between said impulses, and interrupting the circuit at moments of minimum line reaction according to a predetermined code.

20. The method of telegraphing which consists in transmitting over a circuit current impulses derived from a common source of electromotive force and having a gradually rising and falling value and combining impulses of different duration according to a predetermined code.

In witness whereof I have hereunto set my hand, before two subscribing witnesses, this 17th day of May, 1899.

FREDERICK BEDELL.

Witnesses:
   LUZERNE COVILLE,
   FRED H. SMITH.